(12) United States Patent
Wu et al.

(10) Patent No.: US 12,288,840 B2
(45) Date of Patent: Apr. 29, 2025

(54) CYLINDRICAL BATTERY CELL, BATTERY, ELECTRICITY CONSUMING DEVICE, MANUFACTURING METHOD AND MANUFACTURING SYSTEM

(71) Applicant: CONTEMPORARY AMPEREX TECHNOLOGY (HONG KONG) LIMITED, Hong Kong (CN)

(72) Inventors: Kai Wu, Ningde (CN); Chengyou Xing, Ningde (CN); Wenlong Kang, Ningde (CN); Huasheng Su, Ningde (CN); Quankun Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 36 days.

(21) Appl. No.: 18/180,858

(22) Filed: Mar. 9, 2023

(65) Prior Publication Data

US 2023/0246223 A1 Aug. 3, 2023

Related U.S. Application Data

(63) Continuation of application No. PCT/CN2021/113171, filed on Aug. 18, 2021.

(30) Foreign Application Priority Data

Sep. 30, 2020 (CN) .......................... 202011058155.2

(51) Int. Cl.
*H01M 10/04* (2006.01)
*H01M 50/152* (2021.01)
(Continued)

(52) U.S. Cl.
CPC ... *H01M 10/0422* (2013.01); *H01M 10/0409* (2013.01); *H01M 50/152* (2021.01);
(Continued)

(58) Field of Classification Search
CPC ......... H01M 10/0409; H01M 10/0422; H01M 10/0431; H01M 50/107; H01M 50/152;
(Continued)

(56) References Cited

U.S. PATENT DOCUMENTS

| | | | |
|---|---|---|---|
| 6,443,999 B1 | 9/2002 | Cantave et al. | |
| 2002/0061435 A1* | 5/2002 | Hisai ................. | H01M 10/0431 429/211 |

(Continued)

FOREIGN PATENT DOCUMENTS

| | | |
|---|---|---|
| CN | 206742372 A | 12/2017 |
| CN | 208062214 U | 11/2018 |

(Continued)

OTHER PUBLICATIONS

Notice of Reasons for Refusal received in the corresponding Japanese Application 2022-552191, mailed Sep. 26, 2023.

(Continued)

*Primary Examiner* — Lingwen R Zeng
(74) *Attorney, Agent, or Firm* — K&L Gates LLP (57) ABSTRACT

A cylindrical battery cell, a battery, an electricity consuming device, a manufacturing method and a manufacturing system are provided. The cylindrical battery cell includes a shell, including an opening; and an electrode assembly, disposed in the shell, the electrode assembly including a separator and a tab, and along an axial direction of the electrode assembly, the tab being located at one end of the electrode assembly and extending toward the opening, the tab including a first portion and a second portion, the second portion surrounding a periphery of the first portion, and the separator wrapping the second portion to isolate the second portion from the shell, wherein along the axial direction, the first portion extends beyond the second portion and the separator, and the second portion does not extend beyond the (Continued)

separator. The battery cell of the present application solves a problem of short circuit in the battery cell.

14 Claims, 10 Drawing Sheets

(51) Int. Cl.
*H01M 50/538* (2021.01)
*H01M 50/107* (2021.01)
*H01M 50/533* (2021.01)
*H01M 50/55* (2021.01)
*H01M 50/586* (2021.01)
*H01M 50/593* (2021.01)

(52) U.S. Cl.
CPC ...... *H01M 50/538* (2021.01); *H01M 10/0431* (2013.01); *H01M 50/107* (2021.01); *H01M 50/533* (2021.01); *H01M 50/55* (2021.01); *H01M 50/586* (2021.01); *H01M 50/593* (2021.01); *Y02E 60/10* (2013.01); *Y02P 70/50* (2015.11)

(58) Field of Classification Search
CPC ............. H01M 50/533; H01M 50/538; H01M 50/586; H01M 50/593; Y02E 60/10; Y02P 70/50
See application file for complete search history.

(56) References Cited

U.S. PATENT DOCUMENTS

| | | | |
|---|---|---|---|
| 2011/0008660 A1* | 1/2011 | Marple | H01M 4/382 429/94 |
| 2012/0251860 A1 | 10/2012 | Marple et al. | |
| 2017/0047575 A1 | 2/2017 | Tsuji et al. | |
| 2019/0036240 A1 | 1/2019 | Imtiaz et al. | |
| 2019/0363401 A1 | 11/2019 | Lee et al. | |

FOREIGN PATENT DOCUMENTS

| | | |
|---|---|---|
| CN | 209401732 U | 9/2019 |
| CN | 111081966 A | 4/2020 |
| CN | 210576291 U | 5/2020 |
| CN | 210743995 U | 6/2020 |
| CN | 112310574 A | 2/2021 |
| JP | 2006004777 A | 1/2006 |
| JP | 2009289683 A | 12/2009 |
| JP | 2011159440 A | 8/2011 |
| JP | 2015125869 A | 7/2015 |
| JP | 2015162318 A | 9/2015 |
| JP | 2015170395 A | 9/2015 |
| JP | 6593344 B2 | 10/2019 |
| KR | 20010022031 A | 3/2001 |
| KR | 100686859 B1 | 2/2007 |
| KR | 20140112609 A | 9/2014 |
| KR | 20160076030 A | 6/2016 |

OTHER PUBLICATIONS

International Search Report and Written Opinion received in the corresponding International Application PCT/CN2021/113171, mailed Sep. 29, 2021.
First Office Action received in the corresponding Chinese Application 202011058155.2, mailed Jun. 15, 2022.
The extended European search report received in the corresponding European Application 21874111.4, mailed on Sep. 24, 2024.
Request for the Submission of an Opinion received in the corresponding Korean application 10-2022-7029176, mailed on Oct. 11, 2024.
Third party submission received in the counterpart Korean application 10-2022-7029176, issued on Jan. 22, 2025.

* cited by examiner

CYLINDRICAL BATTERY CELL, BATTERY, ELECTRICITY CONSUMING DEVICE, MANUFACTURING METHOD AND MANUFACTURING SYSTEM

CROSS REFERENCE TO RELATED APPLICATION

This application is a continuation of International Application PCT/CN2021/113171, filed Aug. 18, 2021, which claims the priority of the Chinese Patent Application No: 202011058155.2, filed on Sep. 30, 2020 and titled "Cylindrical Battery cell, Battery, Electricity Consuming device, Manufacturing Method and Manufacturing System", which are incorporated herein by reference in their entireties.

TECHNICAL HELD

The present disclosure relates to a technical field of battery, and particularly relates to a cylindrical battery cell, a battery, an electricity consuming device, a manufacturing method and a manufacturing system.

BACKGROUND

Since the rechargeable battery has the advantages of high energy density, high power density, many cycles of use and long storage time, it has been widely used in electric vehicles, mobile devices or electrical tools. The battery includes battery cells. However, during use of the battery cells, there is a problem of short circuit, which affects the safety of the use of the battery cells.

SUMMARY

The present disclosure provides a cylindrical battery cell, a battery, an electricity consuming device, a manufacturing method and a manufacturing system, which aims to solve the above-mentioned technical problem of short circuit of battery cell.

On one aspect, the present disclosure provides a cylindrical battery cell, including:
 a shell, including an opening; and
 an electrode assembly, disposed in the shell, the electrode assembly including a separator and a tab, and along an axial direction of the electrode assembly, the tab being located at one end of the electrode assembly and extending toward the opening, the tab including a first portion and a second portion, the second portion surrounding a periphery of the first portion, and the separator wrapping the second portion to isolate the second portion from the shell,
 wherein along the axial direction, the first portion extends beyond the second portion and the separator, and the second portion does not extend beyond the separator.

According to an embodiment of the present application, a dimension of the first portions extending beyond the separator is H, and a difference between an outer diameter and an inner diameter of the second portion is L, wherein L is greater than H. When the first portion deforms and turns outward, the first portion cannot easily go beyond an edge of the second portion and come into lap contact with the shell, and the possibility of short circuit between the first portion and the shell can be reduced.

According to an embodiment of the present application, the dimension H of the first portion extending beyond the separator ranges from 1 mm to 8 mm.

According to an embodiment of the present application, the cylindrical battery cell further includes a cap and a first insulating member, the cap is configured to cover the opening and connected to the shell, the first insulating member is disposed on a side of the cap close to the electrode assembly, the first insulating member includes a recess, and at least part of the first portion is accommodated in the recess. When the first portion deforms due to the release of its own elastic restoring force, the first portion will be blocked by the first insulating member, thereby further reducing the possibility of the short circuit caused by the lap contact between the first portion and the shell.

According to an embodiment of the present application, the first insulating member is in contact with a part of the separator extending beyond the second portion. Therefore, it is not easy for the external conductive impurities to pass through the contact area between the first insulating member and the separator and come into contact with the first portion, and the possibility that the conductive impurities conduct the first portion with the shell and cause the short circuit between the first portion and the shell can be reduced.

According to an embodiment of the present application, the first insulating member includes a body portion and an extension portion connected with each other, the body portion is configured to connect with the cap, the extension portion extends and protrudes from the body portion and toward the electrode assembly to form the recess, the extension portion surrounds the periphery of the first portion, and the extension portion is in contact with a part of the separator extending beyond the second portion. When performing the assembly, the extension portion of the first insulating member can insert the gap between the first portion and the shell, and thus can guide the first portion to accurately insert into the recess of the first insulating member.

According to an embodiment of the present application, the extension portion is formed as a closed annular structure extending continuously, or is formed as an annular structure with a notch.

According to an embodiment of the present application, the electrode assembly further includes a second insulating member, and the second insulating member surrounds the first insulating member and the second portion, and covers an edge of the first insulating member and an edge of the second portion. The second insulating member can function as a protection, and can block the external conductive impurities.

According to an embodiment of the present application, the second insulating member presses against an outer side surface of the first insulating member facing the shell. A contact area may be formed between the second insulating member and the first insulating member, which is beneficial to further reduce the possibility of conductive impurities entering the tab from the outside of the second insulating member.

According to an embodiment of the present application, the outer side surface includes a guide inclined surface, and the guide inclined surface is inclined toward the recess in a direction away from the cap. The guide slope has a guiding function, so that the part of the first insulating member corresponding to the guide inclined surface can easily enter the space defined by the second insulating member.

According to an embodiment of the present application, the electrode assembly further includes a first electrode plate and a second electrode plate, the first electrode plate and the second electrode plate each includes a coated area and an uncoated area, the uncoated area of the first electrode plate or the second electrode plate forms the tab, the separator is adapted to isolate the first electrode plate from the second electrode plate, and the first electrode plate, the second electrode plate and the separator are wound to form the electrode assembly.

The battery cell according to the embodiments of the present application includes a shell and an electrode assembly. The electrode assembly is arranged in the shell. The electrode assembly includes a main body portion, a separator and a tab. The tab is located at an end of the electrode assembly. The tab includes a first portion and a second portion. The second portion surrounds a periphery of the first portion. The separator wraps the second portion, thereby isolating the second portion from the shell, and reducing the possibility of contact and short circuit between a peripheral surface of the second portion and the shell. Along an axial direction of the electrode assembly, the first portion extends beyond the second portion and the separator, while the second portion does not extend beyond the separator. The separator can form a protection for the second portion to reduce the possibility of the second portion coming into contact with the shell. In addition, since the second portion does not need to be processed by a bending process or a flattening process, the second portion itself does not accumulate elastic potential energy or accumulates small elastic potential energy; therefore, the second portion is not easily deformed or is deformed slightly, and thus it is not easy for the second portion to deform and turn outwards and come into lap contact with the shell, thereby reducing the possibility of short circuit between the second portion and the shell. The second portion can also serve as a buffer area, so that it is not easy for the first portion to come into lap contact with the shell, thereby effectively reducing the possibility of the short circuit between the first portion and the shell.

On a further aspect, the present application provides a battery including the cylindrical battery cell according to the above embodiments.

On a further aspect, the present application provides an electricity consuming device, including the cylindrical battery cell according to the above embodiments, the cylindrical battery cell being adapted to provide electrical energy.

On a further aspect, the present application provides a manufacturing method of a cylindrical battery cell, the method including steps of:
  providing an electrode assembly, the electrode assembly including a separator and a tab, the tab including a first portion and a second portion, the second portion surrounding a periphery of the first portion, the separator wrapping the second portion to isolate the second portion from the shell, wherein along an axial direction, the first portion extends beyond the second portion and the second portion does not extend beyond the separator;
  providing a shell including an opening; and
  loading the electrode assembly into the shell, wherein along the axial direction of the electrode assembly, the tab is located at one end of the electrode assembly and extends toward the opening.

According to an embodiment of the present application, a par of the tab of the electrode assembly is cut away to form the second portion.

On another aspect, the present application provides a manufacturing system for a cylindrical battery cell, including:
  a first assembling device, configured to provide an electrode assembly, the electrode assembly including a separator and a tab, the tab including a first portion and a second portion, the second portion surrounding a periphery of the first portion, the separator wrapping the second portion to isolate the second portion from the shell, wherein along an axial direction, the first portion extends beyond the second portion and the separator, and the second portion does not extend beyond the separator;
  a second assembling device, configured to provide a shell including an opening; and
  a third assembling device, configured to load the electrode assembly into the shell, wherein along the axial direction of the electrode assembly, the tab is located at one end of the electrode assembly and extends toward the opening.

BRIEF DESCRIPTION OF THE DRAWINGS

The features, advantages and technical effects of the exemplary embodiments of the present application will be described below with reference to the accompanying drawings.

In the accompanying drawings, the drawings are not necessarily drawn to actual scale.

DETAILED DESCRIPTION

The implementations of the present application are described below in further detail with reference to the accompanying drawings and embodiments. The following detailed description of the embodiments and the accompanying drawings are used to exemplarily illustrate the principle of the present application, but cannot be used to limit the scope of the present application, that is, the present application is not limited to the described embodiments.

In the description of the present application, it should be noted that, unless otherwise stated, "a plurality of" means two or more; the orientation or positional relationship indicated by the terms "upper", "lower", "left", "right", "inside", "outside" or the like is merely used for convenience of describing the present application and simplifying the description, rather than indicating or implying that the device or element referred to must have a particular orientation, or be constructed and operated in a particular orientation, and therefore cannot be understood as a limitation to the present application. In addition, the terms "first", "second", "third", or the like are only used for descriptive purposes, and cannot be understood as indicating or implying relative importance. "Perpendicularity" does not mean a strict perpendicularity, but allows an error within an allowed range. "Parallel" does not mean a strict parallel but allows an error within an allowed range.

The orientation words appearing in the following description all refer to the directions shown in the drawings, and are not intended to define the specific structure of the present application. In the description of the present application, it should also be noted that, unless otherwise clearly defined and specified, the terms "install", "connect", and "couple" should be understood in a broad sense, for example, may refer to a fixed connection, a detachable connection, or an integral connection, and may refer to a direct connection or an indirect connection through an intermediate medium. For the person skilled in the art, the specific meaning of the above-mentioned terms in the present application can be understood according to specific circumstances.

After noticing the problem of short circuit in the battery cells of prior art, the applicant conducts research and analysis on the structure of the battery cells. The battery cell includes a shell, an electrode assembly, a cap, an electrode terminal, and an adapter piece. The electrode assembly is disposed in the shell. The cap is connected to the shell. The electrode terminal is disposed on the cap. The electrode assembly includes a main body portion and a tab. The tab extends from the main body portion in a direction away from the main body portion. The adapter piece connects the electrode terminals to the tab of the electrode assembly. The applicant found that the tab of the battery cell may lap and contact with the shell, which leads to the short circuit of the battery cell. The applicant has further researched and found that the tab of the electrode assembly may be processed by a bending process or a flattening process, so as to be deformed to meet the assembly requirements, and thus the tab itself will accumulate elastic restoring force. When the assembly of the battery cell is completed, the tab does not lap with the shell, and thus no short circuit occurs. However, after using for a period of time, the tab will release the elastic restoring force accumulated by itself and rebound, resulting in that the tab laps with the shell and the short circuit between the tab and the shell may occur.

Based on the above problems found by the applicant, the applicant improved the structure of the battery cell. The embodiments of the present application are further described below.

In order to better understand the present application, the embodiments of the present application are described below with reference to FIGS. 1 to 16.

Figure 1:
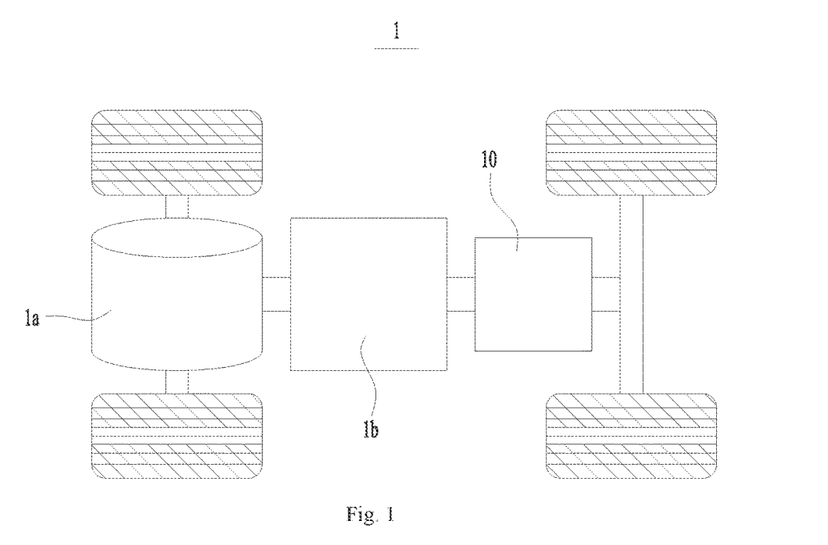
FIG. 1 is a structural schematic diagram of a vehicle according to an embodiment of the present application.

The embodiment of the present application provides an electricity consuming device using a battery 10 as a power source. The electricity consuming device can be, but not limited to, a vehicle, a ship, or an aircraft. Referring to FIG. 1, an embodiment of the present application provides a vehicle 1. The vehicle 1 may be a fuel vehicle, a gas vehicle or a new energy vehicle. The new energy vehicle can be a pure electric vehicle, a hybrid vehicle or an extended-range vehicle. In an embodiment of the present application, the vehicle 1 may include a motor 1a, a controller 1b and a battery 10. The controller 1b is used to control the battery 10 to supply power to the motor 1a. The motor 1a is connected to the wheels through a transmission mechanism, and thus drives the vehicle 1 to travel. The battery 10 can be used as a driving power source of the vehicle 1 to provide driving power for the vehicle 1 in place of or partially in place of fuel or natural gas. In an example, the battery 10 may be provided at the bottom or at the head or tail of the vehicle 1. The battery 10 may be used to supply electrical power to the vehicle 1. In an example, the battery 10 may be used as an operating power source of the vehicle 1 for an electrical system of the vehicle 1. By way of example, the battery 10 may be used to satisfy the operating power requirements of the vehicle 1 for starting, navigating, and operating.

Figure 2:
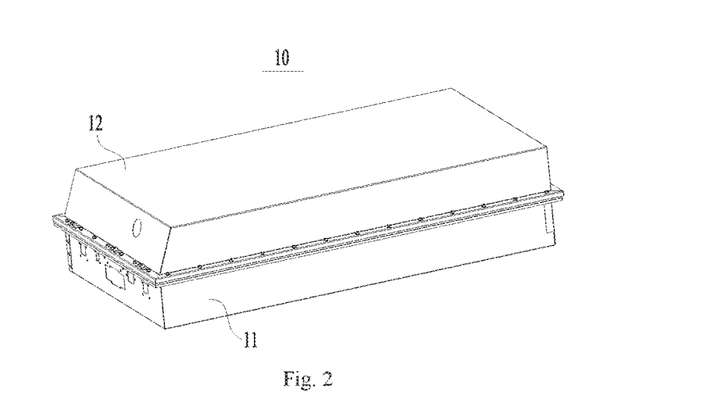
FIG. 2. is a structural schematic diagram of a battery according to an embodiment of the application.
Figure 3:
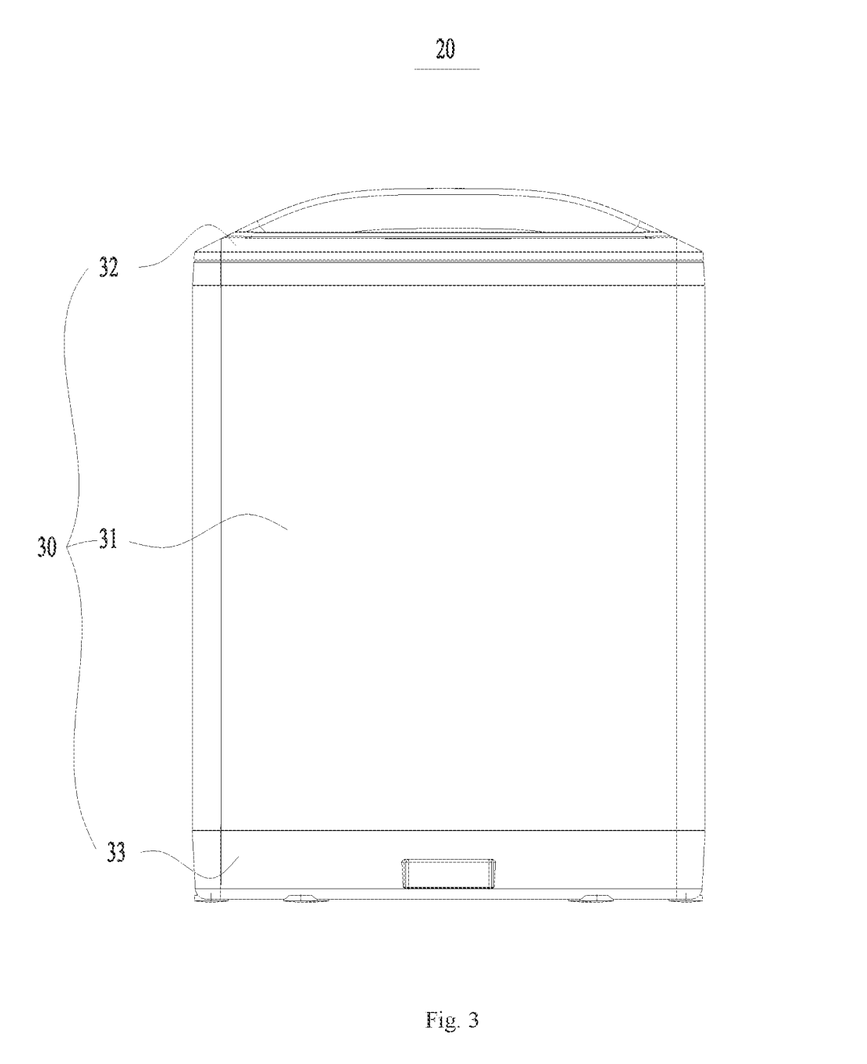
FIG. 3 is a structural schematic diagram of a battery module according to an embodiment of the present application.

Referring to FIGS. 2 and 3, the battery 10 includes a case. The type of the case is not limited. The case may be a frame-shaped case, a disc-shaped case, a box-shaped case, or the like, Exemplarily, the case includes a lower case 11 and an upper cover 12 for covering and closing the lower case 11. The lower case 11 and the upper case 12 cover and close each other to form a receiving portion. The battery 10 includes a plurality of cylindrical battery cells 40. The cylindrical battery cell 40 refers to a battery cell 40 which is formed in a cylindrical shape in appearance. The plurality of battery cells 40 may form the battery 10, or the plurality of battery cells 40 may form battery modules 20 at first, and then a plurality of battery modules 20 may form the battery 10. FIG. 3 schematically shows the battery module 20 according to an embodiment, and the battery module 20 is disposed in the receiving portion of the case.

In some embodiments, in order to meet different power usage requirements, the battery 10 may include a plurality of battery cells 40, wherein the plurality of battery cells 40 may be connected in series, in parallel or in a mixed manner, and the mixed manner refers to a mix of series and parallel connections. That is to say, the plurality of battery cells 40 may be directly disposed in the receiving portion of the case to form the battery 10.

Figure 4:
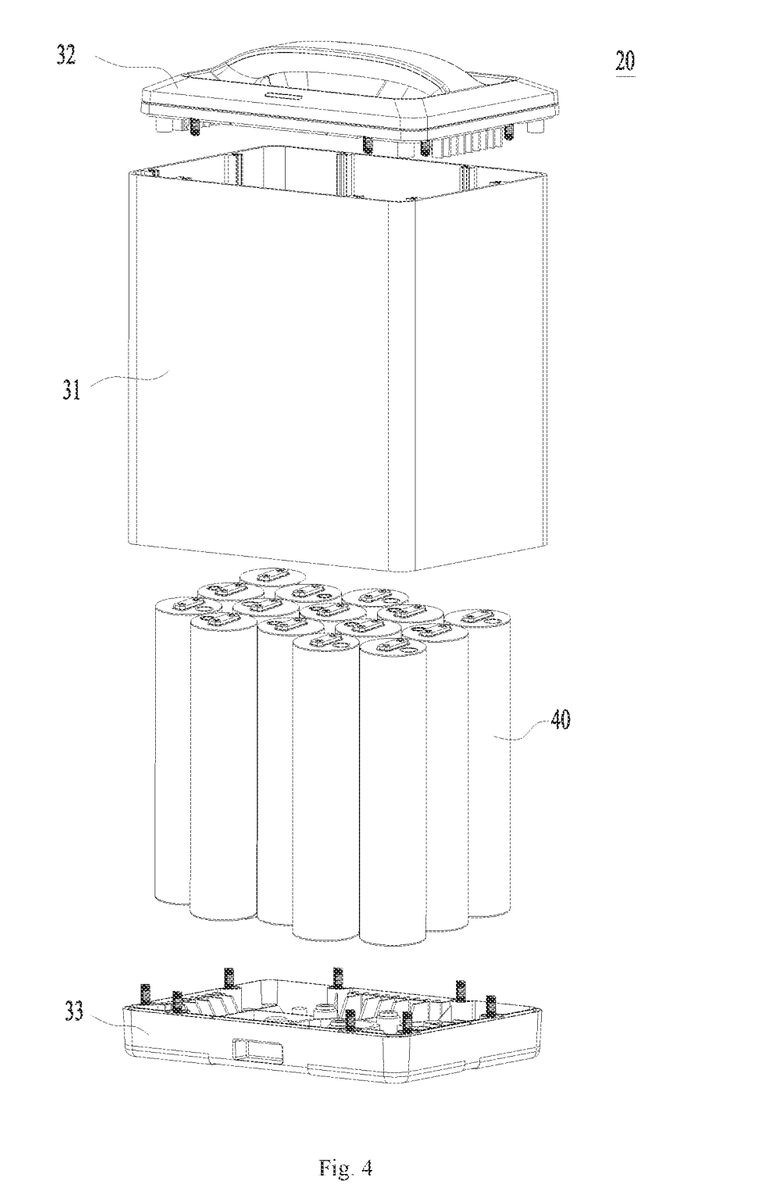
FIG. 4 is an exploded structural schematic diagram of a battery module according to an embodiment of the present application.

Referring to FIGS. 3 and 4, the battery module 20 includes a casing 30 and battery cells 40 disposed in the casing 30. In an example, the casing 30 includes a tubular body 31, a first cover body 32 and a second cover body 33. The first cover body 32 and the second cover body 33 are respectively disposed on two ends of the tubular body 31. The first cover body 32 and the second cover body 33 are respectively detachably connected to the tubular body 31. For example, the first cover body 32 and the second cover body 33 can be respectively connected to the tubular body 31 in a snapping manner or by screws. The tubular body 31, the first cover body 32 and the second cover body 33 are assembled to form an accommodating space. The battery cells 40 are arranged in the accommodating space of the casing 30.

Figure 5:
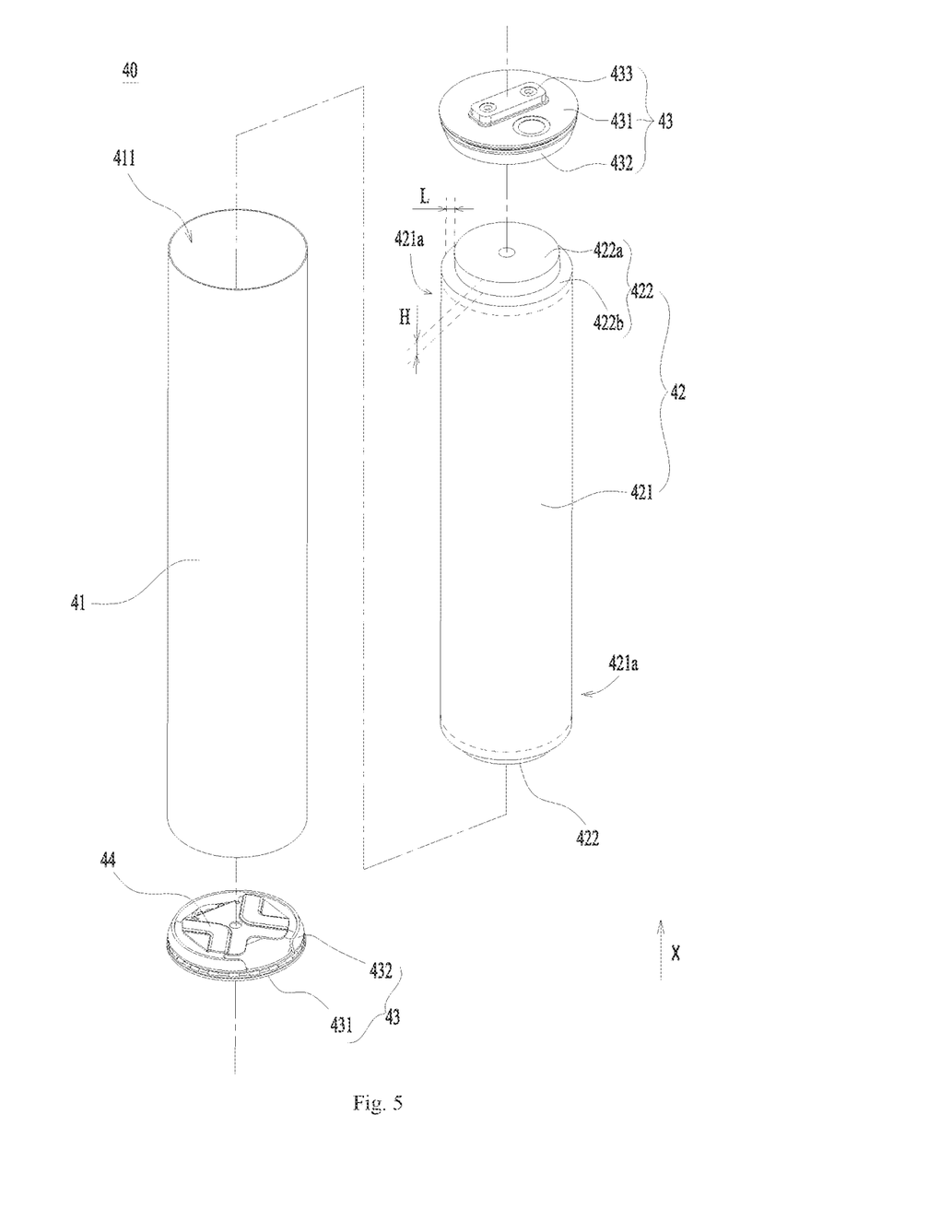
FIG. 5 is an exploded structural schematic diagram of the battery cell according to an embodiment of the present application.

Referring to FIG. 5, the battery cell 40 of the embodiment of the present application includes a shell 41 and an electrode assembly 42 disposed in the shell 41. The shell 41 in the embodiment of the present application is formed as a tubular structure. The shell 41 includes an inner space for accommodating the electrode assembly 42 and electrolyte, and an opening 411 communicating with the inner space. The electrode assembly 42 can be loaded into the shell 41 through the opening 411 of the shell 41. The shell 41 may be made of materials such as aluminum, aluminum alloy, or plastic. The electrode assembly 42 includes a main body portion 421 in a shape of column and a tab 422. Along an axial direction X of the electrode assembly 42, the tab 422 is located at one end of the electrode assembly 42. The main body portion 421 includes an end portion 421a. The electrode assembly 42 is disposed in the shell 41, the end portion 421a of the main body portion 421 faces the opening 411 of the shell 41, and the tab 422. extend from the end portion 421a of the main body portion 421 towards the opening 411 of the shell 41. The tab 422 includes a first portion 422a and a second portion 422b. The second portion 422b surrounds a periphery of the first portion 422a, Along the axial direction X of the electrode assembly 42, an orthographic projection of the first portion 422a is located inside an orthographic projection of the second portion 422b.

Referring to FIG. 5, the battery cell 40 of the embodiment of the present application further includes a cap assembly 43 and an adapter piece 44. The cap assembly 43 is used to close the opening 411 of the shell 41. The cap assembly 43 includes a cap 431, a first insulating member 432 and an electrode terminal 433. The cap 431 is configured to cover the opening 411 of the shell 41 and is connected to the shell 41. For example, the cap 431 may be welded to the shell 41. The first insulating member 432 and the electrode terminal 433 are both disposed on the cap 431. The first insulating member 432 is disposed on a side of the cap 431 close to an inside of the shell 41. The electrode terminal 433 is electrically connected with the electrode assembly 42 through the adapter piece 44. Exemplarily, the shell 41 includes two openings 411 opposite each other. The number of the cap assemblies 43 and the number of the adapter pieces 44 are both two. Two caps 431 cover the two openings 411 respectively and are both connected with the shell 41. Each of the two ends of the electrode assembly 42 opposite each other is provided with one cap assembly 43 and one adapter piece 44 correspondingly.

Figure 6:
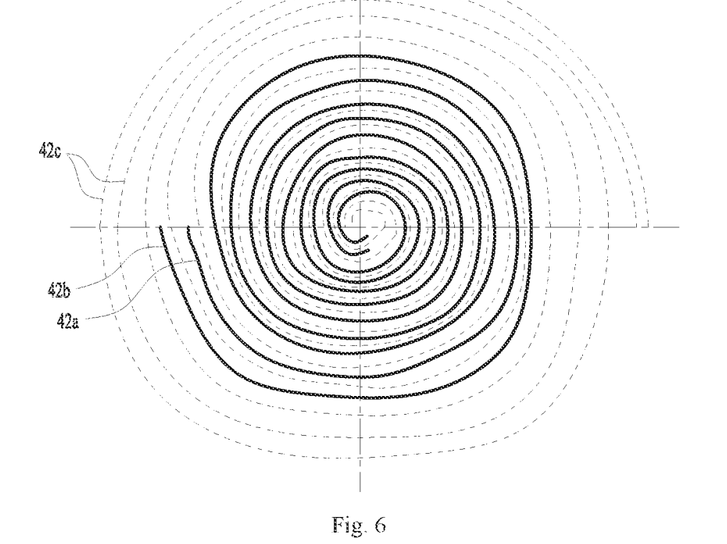
FIG. 6 is an structural schematic diagram of an electrode assembly according to an embodiment of the present application.

Referring to FIG. 6, the electrode assembly 42 of the embodiment of the present application can be formed by winding a first electrode plate 42a, a second electrode plate 42b and a separator 42c together, wherein the separator 42c is an insulator interposed between the first electrode plate 42a and the second electrode plate 42b. The separator 42c is used for insulating and isolating the first electrode plate 42a and the second electrode plate 42b, so as to prevent the first electrode plate 42a and the second electrode plate 42b from contacting with each other. The first electrode plate 42a and the second electrode plate 42b each include a coated area and an uncoated area. An active material of the first electrode plate 42a is coated on the coated area of the first electrode plate 42a, and an active material of the second electrode plate 42b is coated on the coated area of the second electrode plate 42b. In the coated area, the active material is coated on a current collector formed of a metal sheet, while no active material is coated in the uncoated area. The part of the electrode assembly 42 corresponding to the coated area of the first electrode plate 42a and the second electrode plate 42b is the main body portion 421. The uncoated area of the first electrode plate 42a or the uncoated area of the second electrode plate 42h forms the tab 422. The main body portion 421 includes two end portions 421a opposite each other. The tab 422 extends from one end portion 421a of the main body portion 421. The tab 422 in the electrode assembly 42 is formed in a multi-layer structure. Exemplarily, the uncoated area of the first electrode plate 42a are stacked to form a positive tab, while the uncoated area of the second electrode plate 42b are stacked to form a negative tab. The positive tab and the negative tab respectively extend from one end portion 421a of the main body portion 421. When the first electrode plate 42a, the second electrode plate 42b, and the separator 42c are wound together, the separator 42c is individually wound by a predetermined number of additional turns, at the end of the winding process.

In the embodiment of the present application, along the axial direction X of the electrode assembly 42, the dimension of the separator 42c is larger than that of the coated area of the first electrode plate 42a, and is also larger than the dimension of the coated area of the second electrode plate 42h. Therefore, along the axial direction X of the electrode assembly 42, a part of the separator 42c of the electrode assembly 42 extends beyond the main body portion 421.

Figure 7:
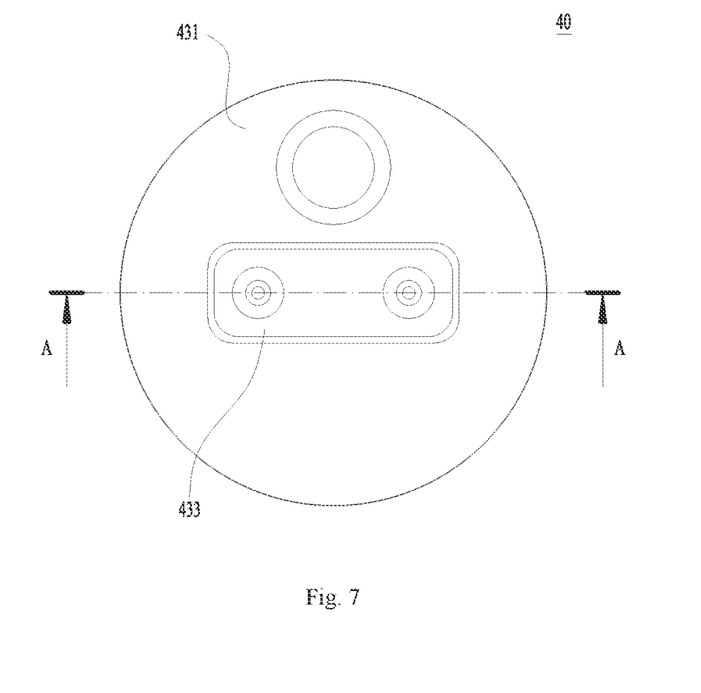
FIG. 7 is structure schematic diagram of a top view of a battery cell of the embodiment shown in FIG. 5 after the assembly is completed.
Figure 8:
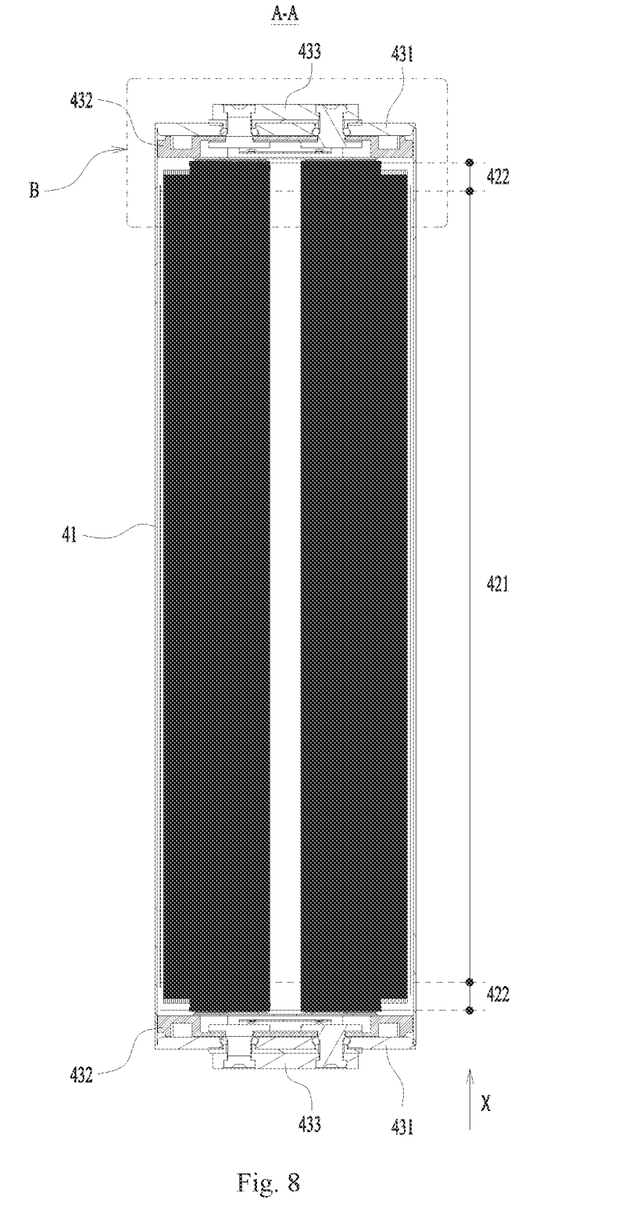
FIG. 8 is a cross-sectional structural schematic diagram along A-A in FIG. 7.

Referring to FIGS. 7 and 8, the cap 431 and the shell 41 are connected to enclose the electrode assembly 42 in the shell 41. The first insulating member 432 may isolate the electrode assembly 42 from the cap 431. The electrode assembly 42 includes two tabs 422 opposite each other. The two tabs 422 extend from two end portions 421a of the main body portion 421, respectively. The two tabs 422 have opposite polarities. Two electrode terminals 433 are respectively connected to the two tabs 422. Two first insulating members 432 are respectively connected to the two caps 431.

Figure 9:
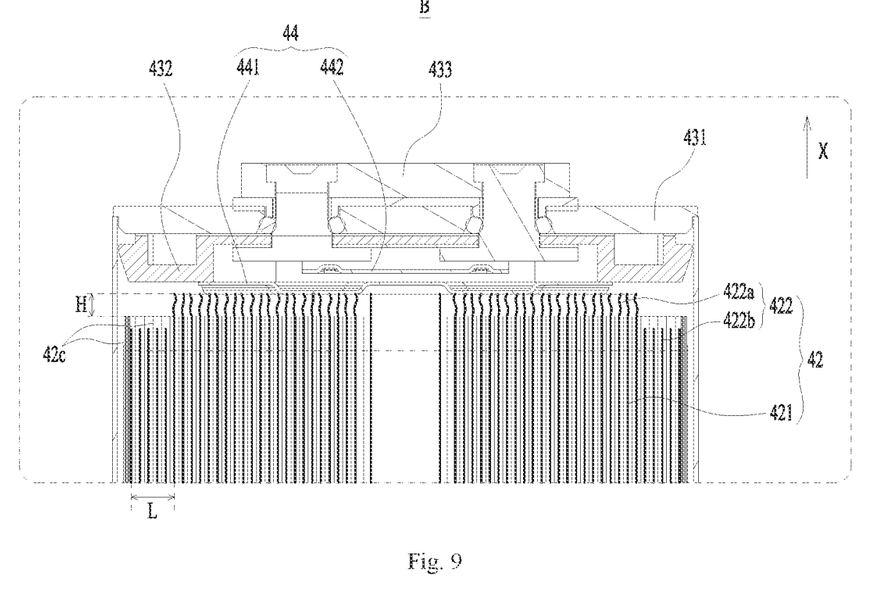
FIG. 9 is an enlarged view of position B in FIG. 8.

Referring to FIG. 9, the separator 42c wraps the second portion 422b to isolate the second portion 422b from the shell 41, thereby reducing the possibility that second portion 422b facing the shell 41 comes into contact with the shell 41 and causes the short circuit between the second portion 422b and the shell 41. The separator 42c extends from a periphery of the main body portion 421 to the second portion 422b in the axial direction X so as to wrap the second portion 422b. Along the axial direction X of the electrode assembly 42, the first portion 422a of the tab 422 extends beyond the second portion 422b of the tab 422 and the separator 42c. The first portion 422a of the tab 422 is connected with the adapter piece 44. For example, the first portion 422a is welded to the adapter piece 44. Along the axial direction X of the electrode assembly 42, the second portion 422b of the tab 422 does not extend beyond the separator 42c. In some examples, along the axial direction X of the electrode assembly 42, the separator 42c extends beyond the second portion 422b. Since the separator 42c can form an insulating protection for the second portion 422b, the possibility of contact and short circuit between the second portion 422b and the shell 41 can be reduced.

In some embodiments, the electrode plate (the first electrode plate 42a or the second electrode plate 42b) is subjected to a cutting process during manufacturing process, so that the width (the dimension along the axial direction X) of the area corresponding to the second portion 422b on the electrode plate is smaller than the width (the dimension along the axial direction X) of the area corresponding to the first portion 422a on the electrode plate, and thus, after the winding process of the electrode plates and the separator 42c is completed, it can be ensured that the first portion 422a of the electrode plate extends beyond the second portion 422b.

In some embodiments, an end of the first portion 422a of the electrode plate away from the main body portion 421 is used to connect with the adapter piece 44, and the second portion 422b of the electrode plate does not need to connect with the adapter piece 44. The end of the first portion 422a of the electrode plate away from the main body portion 421 needs to be processed by a bending process or a flattening process. After processed by the bending process or the flattening process, the end of the first portion 422a away from the main body portion 421 will become more compact.

The battery cell 40 of the embodiments of the present application includes a shell 41 and an electrode assembly 42. The electrode assembly 42 is disposed in the shell 41. The electrode assembly 42 includes a main body portion 421, a separator 42c and a tab 422. The tab 422 is located at an end of the main body portion 421. The tab 422 includes a first portion 422a and a second portion 422b. The second portion 422b surrounds a periphery of the first portion 422a. The separator 42c extends from a periphery of the main body portion 421 to the second portion 422b and wraps the second portion 422b, thereby isolating the second portion 422b from the shell 41, and reducing the possibility of contact and short circuit between a peripheral surface of the second portion 422b and the shell 41. Along an axial direction X of the electrode assembly 42, the first portion 422a extends beyond the second portion 422b and the separator 42c, while the second portion 422b does not extend beyond the separator 42c. The separator 42c can form a protection for the second portion 422b and reduce the possibility of the second portion 422b coming into contact with the shell 41. In addition, since the second portion 422b does not need to be processed by a bending process or a flattening process, the second portion 422b itself does not accumulate elastic potential energy or accumulates small elastic potential energy; therefore, the second portion 422b is not easily deformed or is deformed slightly, and thus it is not easy for the second portion 422b to deform and turn outwards, and come into lap contact with the shell 41, thereby reducing the possibility of short circuit between the second portion 422b and the shell 41. The second portion 422b can also serve as a buffer area, so that it is not easy for the first portion 422a to come into lap contact with the shell 41, thereby effectively reducing the passibility of the short circuit between the first portion 422a and the shell 41.

In some embodiments, as shown in FIG. 9, along the axial direction X of the electrode assembly 42, the dimension of the first portion 422a extending beyond the separator 42c is II, and along a radial direction of the main body portion 421, the difference between an outer diameter and an inner diameter of the second portion 422b is L, where L is greater than H. In this way, when the first portion 422a deforms and turns outwards, it is not easy for the first portion 422a to extend beyond an edge of the second portion 422b and make lap contact with the shell 41, thereby reducing the possibility of the short circuit between the first portion 422a and the shell 41. In some examples, L takes a value from 1.1 H to 1.5 H. The dimension H of the first portion 422a extending beyond the separator 42c ranges from 1 millimeter (mm) to 8 millimeters (mm).

Figure 10:
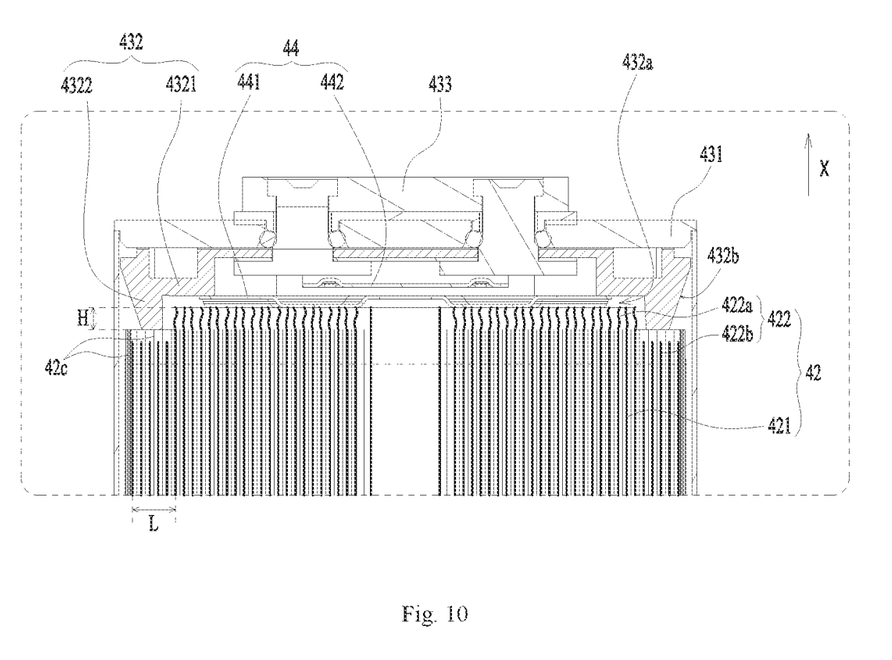
FIG. 10 is a partial cross-sectional structural schematic diagram of a battery cell according to an embodiment of the present application.

In some embodiments, as shown in FIG. 10, the first insulating member 432 includes a recess 432a. The recess 432a is formed by recessing from a surface of the first insulating member 432. away from the cap 431 toward the cap 431 so that an opening of the recess 432a faces the electrode assembly 42. At least part of the first portion 422a is received in the recess 432a, The first insulating member 432 forms a protection on the periphery of the first portion 422a, thereby isolating the first portion 422a from the shell 41. During the use of the battery cell 40, when the first portion 422a deforms due to the release of its own elastic restoring force, the first portion 422a will be blocked by the first insulating member 432, and thus the possibility of short circuit between the first portion 422a and the shell 41 due to the lap contact between them can be further reduced.

In some embodiments, as shown in FIG. 10, the first insulating member 432 is in contact with a part of the separator 42c extending beyond the second portion 422b, thereby forming a contact area. In this way, it is not easy for external conductive impurities to pass through the contact area between the first insulating member 432 and the separator 42c and come into contact with the first portion 422a, and thus, the possibility of short circuit between the first portion 422a and the shell 41 due to conduction between the first portion 422a and the shell 41 through the conductive impurities can be reduced.

Figure 11:
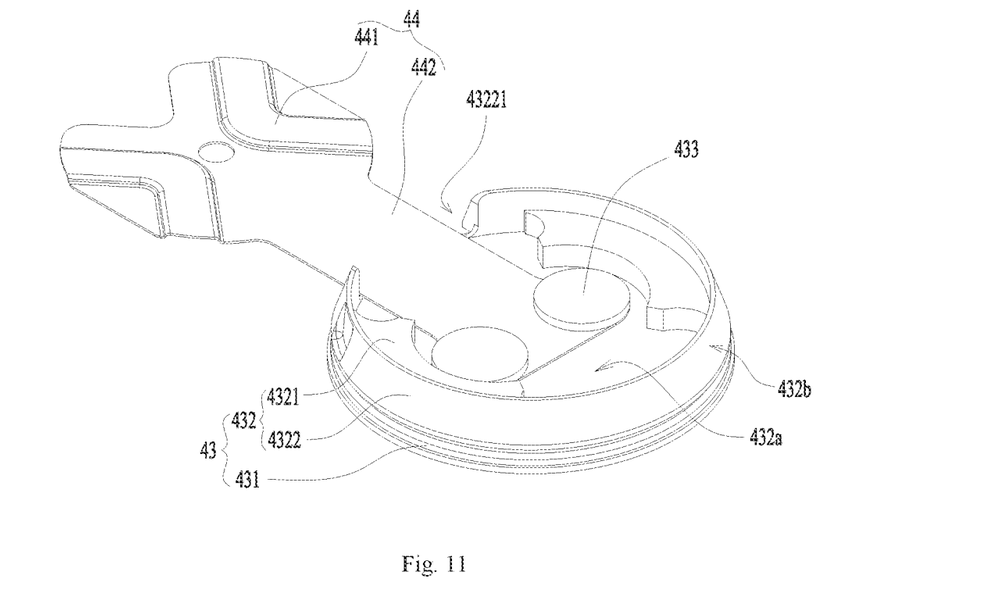
FIG. 11 is a structural schematic diagram of a cap assembly according to an embodiment of the present application.

In some embodiments, as shown in FIGS. 10 and 11, the first insulating member 432. includes a body portion 4321 and an extension portion 4322 connected to each other. The first insulating member 432 is connected to the cap 431 through the body portion 4321. The extension portion 4322 extends and protrudes from the body portion 4321 toward the electrode assembly 42. The body portion 4321 and the extension portion 4322 intersect with each other. The body portion 4321 and the extension portion 4322 form the recess 432a. The extension portion 4322 is disposed on a peripheral side of the first portion 422a of the tab 422, and corresponds to the second portion 422b in position along the axial direction X. The extension portion 4322 extends along the peripheral side of the first portion 422a. The first insulating member 432 is in contact with the part of the separator 42c extending beyond the second portion 422b through the extension portion 4322. The first insulating member 432 can be connected and fixed to the cap 431 in advance through the body portion 4321, and then the cap 431 carried with the first insulating member 432 is assembled with the shell 41. Since the first insulating member 432 includes the extension portion 4322, the extension portion 4322 of the first insulating member 432 can be inserted into a gap between the first portion 422a and the shell 41 during assembly, and thus, the extension portion 4322 can guide the first portion 422a to accurately insert into the recess 432a of the first insulating member 432, thereby reducing the possibility that the first portion 422a is compressed and deformed during the assembly due to the first insulating member 432. pressing the first portion 422a along the axial direction X, and meanwhile making the extension portion 4322 to protect and limit the first portion 422a early during the assembly process.

In some examples, the first insulating member 432 may be a cover body of a spherical structure. A surface of the first insulating member 432 where the recess 432a is formed, is a spherical surface.

In some embodiments, as shown in FIGS. 10 and 11, the adapter piece 44 includes a first adapter portion 441 and a second adapter portion 442. The first adapter portion 441 and the second adapter portion 442 are connected to each other. The adapter piece 44 is connected with the first portion 422a of the tab 422 through the first adapter portion 441. For example, the first adapter portion 441 and the first portion 422a are connected by welding. The adapter piece 44 is connected with the electrode terminal 433 through the second adapter portion 442. For example, the second adapter portion 442 and the electrode terminal 433 are connected by rivets. Referring to FIG. 10, after the assembly of the battery cell 40 is completed, the first adapter portion 441 is bent relative to the second adapter portion 442. The first adapter portion 441 is located between the first insulating member 432 and the electrode assembly 42 and is located in the recess 432a. The first insulating member 432 and the electrode assembly 42 press the first adapter portion 441 together, so that the first adapter portion 441 cannot move relative to the electrode assembly 42 in position easily, and thus it is beneficial to reduce the possibility of disconnection between the first adapter portion 441 and the first portion 422a caused by the movement of the first adapter portion 441 relative to the electrode assembly 42. In one example, the body portion 4321 of the first insulating member 432 and the electrode assembly 42 press the first adapter portion 441 together.

In some embodiments, FIG. 11 schematically shows a state in which the adapter piece 44 is connected with the electrode terminal 433 but is not bent. Referring to FIG. 11, the extension portion 4322 is formed as an annular structure with a notch 43221, so that an end surface of the extension portion 4322 away from the cap 431 is formed as a structure of a split annulus. The notch 43221 of the extension portion 4322 can avoid the second adapter portion 442. The second adapter portion 442 of the adapter piece 44 can pass through the notch 43221, and thus, during the manufacturing process of the adapter piece 44, the first adapter portion 441 and the second adapter portion 442 of the adapter piece 44 remain in a flat state, and processing steps of the adapter piece 44 can be reduced. All the parts of the extension portion 4322 except the notch 43221 can press against the separator 42c.

Figure 12:
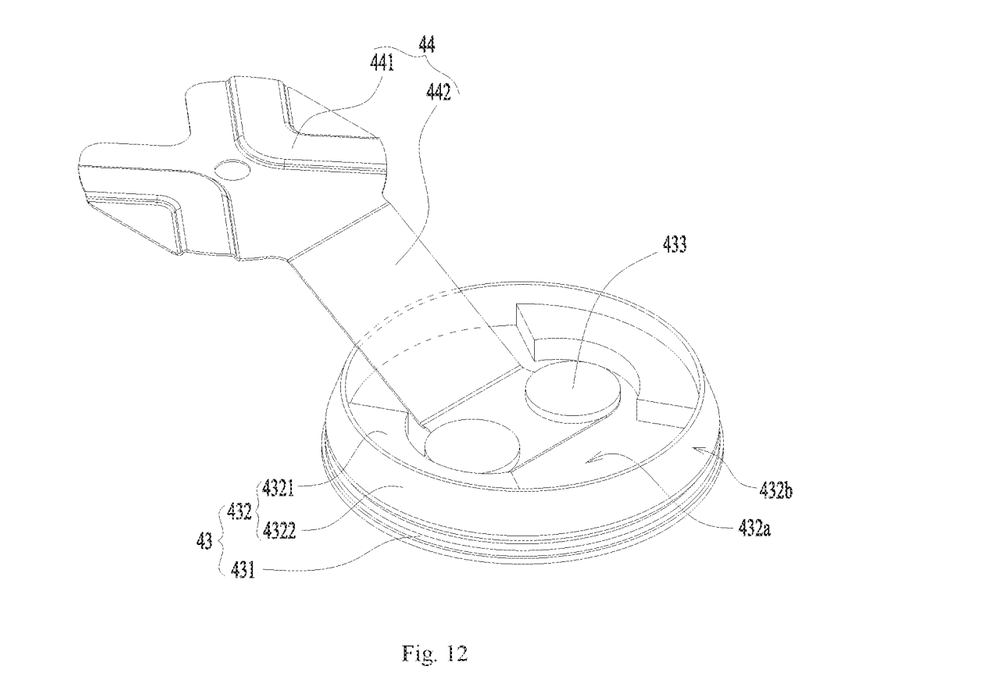
FIG. 12 is a structural schematic diagram of a cap assembly according to another embodiment of the present application.

In some embodiments, FIG. 12 schematically shows a state in which the adapter piece 44 is connected with the electrode terminal 433 but is not bent. Referring to FIG. 12, the extension portion 4322 is formed as a closed annular structure, so that an end surface of the extension portion 4322 away from the cap 431 is formed as a structure of a closed annulus. The first adapter portion 441 and the second adapter portion 442 of the adapter piece 44 need to be bent during manufacturing, so that the adapter piece 44 can avoid the extension portion 4322 after the second adapter portion 442 and the electrode terminal 433 are connected. The extension portion 4322 can press against the separator 42c, and since the end surface of the extension portion 4322 away from the cap 431 is formed as a structure of a closed annulus, the extension portion 4322 can form a protection and isolation for the first portion 422a on the entire periphery of the first portion 422a, which is beneficial to further improve the isolation and protection effect.

Figure 13:
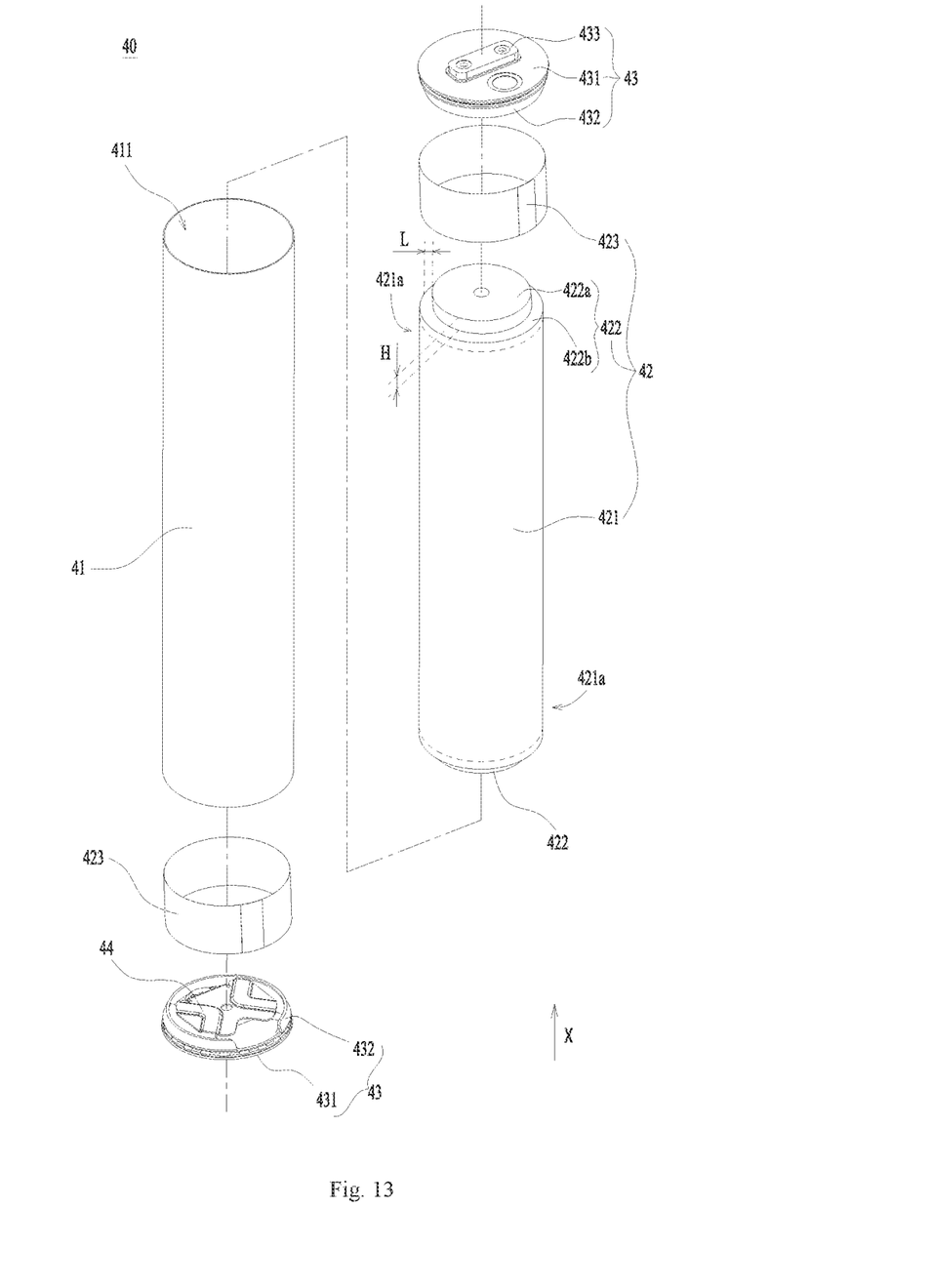
FIG. 13 is an exploded structural schematic diagram of a battery cell according to another embodiment of the present application.
Figure 14:
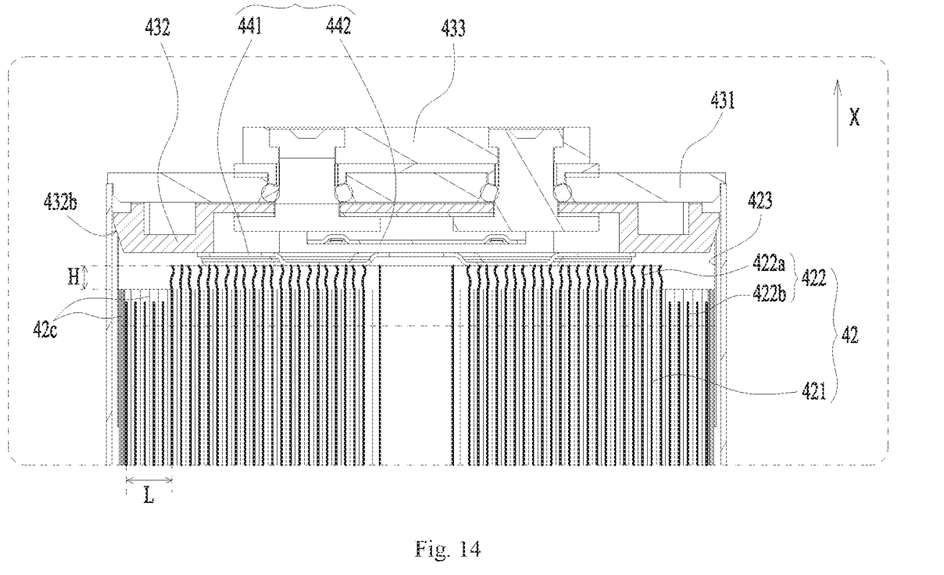
FIG. 14 is a partial cross-sectional structural schematic diagram of a battery cell according to an embodiment of the present application.

In some embodiments, as shown in FIGS. 13 and 14, the electrode assembly 42 further includes a second insulating member 423. The second insulating member 423 surrounds the first insulating member 432 and the second portion 422b, and covers an edge of the first insulating member 432 and an edge of the second portion 422b. Along the axial direction X of the electrode assembly 42, the edge of the first insulating member 432 faces the edge of the second portion 422b. The second insulating member 423 can provide protection, so as to reduce the possibility that the external conductive impurities enter the position between the first insulating member 432 and the second portion 422b and short-circuit the second portion 422b and the shell 41, or, reduce the possibility that the external conductive impurities pass through the position between the first insulating member 432 and the second portion 422b and short-circuit the first portion 422a and the shell 41.

In some examples, the first insulating member 432 includes the extension portion 4322. The second insulating member 423 covers an edge of the extension portion 4322 and an edge of the second portion 422b. In some examples, the second insulating member 423 is formed as an annular structure. The second insulating member 423 continuously extends along a peripheral side of the extension portion 4322, so as to form a protection in the entire peripheral direction of the extension portion 4322.

In some examples, the second insulating member 423 may be a separate structural member. In the assembling process, it is necessary to assemble the second insulating member 423 to the periphery of the first portion 422a in advance. Then, the electrode assembly 42 carried with the second insulating member 423 is loaded into the shell 41.

In some embodiments, the first insulating member 432 includes an outer side surface 432b facing the shell 41. One end of the second insulating member 423 presses against the outer side surface 432b of the first insulating member 432, so that a contact area can be formed between the second insulating member 423 and the first insulating member 432, which is beneficial to further reduce the possibility that the conductive impurities enter the tab 422 from the outside of the first insulating member 432.

In some examples, the outer side surface 432b includes a guide inclined surface. In a direction away from the cap 431, the guide inclined surface is inclined toward the recess 432a, As such, when the cap assembly 43 is assembled after the electrode assembly 42 carried with the second insulating member 423 is loaded into the shell 41 in advance, under the guiding action of the guiding inclined surface, the part of the first insulating member 432 corresponding to the guiding inclined surface can easily enter the space defined by the second insulating member 423, which is beneficial to reduce the possibility of the collapse of the second insulating member 423 and the loss of the isolating function of the second insulating member 423 caused by the first insulating member 432 directly pressing against the second insulating member 423. In the embodiments in which the first insulating member 432 includes the body portion 4321 and the extension portion 4322, the guide inclined surface provided on the first insulating member 432 makes the peripheral surface of the extension portion 4322 tapered.

In some examples, the second insulating member 423 is adhered to the outer side surface 432b of the first insulating member 432, which is beneficial to improve the connection reliability and stability between the second insulating member 423 and the first insulating member 432, and reduce the possibility that the second insulating member 423 and the first insulating member 432 are out of contact due to shock, vibration and other working conditions during the use of the battery cell 40. Exemplarily, the second insulating member 423 may be adhered to the outer side surface 432b of the first insulating member 432 by tapes or adhesives.

In some examples, an area through which the second insulating member 423 presses against the outer side surface 432b of the first insulating member 432 is closer to the cap 431 than the tab 422, so that the contact area between the second insulating member 423 and the first insulating member 432 is closer to the cap 431. During the assembly process, the first insulating member 432 can come into contact with the second insulating member 423 more quickly, thereby further reducing the possibility that the conductive impurities enters the tab 422 through the gap between the first insulating member 432 and the second insulating member 423 that are still not contact with each other, during the assembly process.

Figure 15:
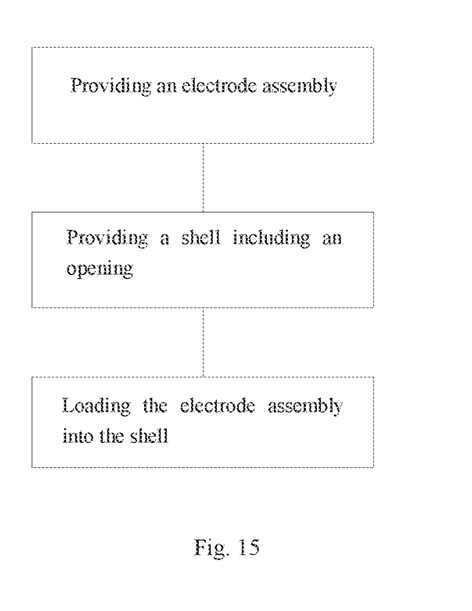
FIG. 15 is a flow chart of a manufacturing method for a battery cell according to an embodiment of the present application.

Referring to FIG. 15, based on the battery cell 40 of the above-mentioned embodiments, the embodiments of the present application further provide a manufacturing method for the battery cell 40, the method includes steps of:

providing an electrode assembly 42, the electrode assembly 42 including a separator 42c and a tab 422, the tab 422 including a first portion 422a and a second portion 422b, the second portion 422b surrounding a periphery of the first portion 422a, and the separator 42c wrapping the second portion 422b to isolate the second portion 422b from a shell 41, wherein along an axial direction X, the first portion 422a extends beyond the second portion 422b and the separator 42c, and the second portion 422b does not extend beyond the separator 42c;

providing the shell 41 including an opening; and loading the electrode assembly 42 into the shell 41, wherein along the axial direction X of the electrode assembly 42, the tab 422 is located at one end of the electrode assembly 42 and extends toward the opening.

In the battery cell 40 manufactured by the manufacturing method for the battery cell 40 according to the embodiments of the present application, the electrode assembly 42 including the separator 42c and the tab 422 is loaded into the shell 41, and the tab 422 is oriented to the opening of the shell 41. When manufacturing the electrode assembly 42, the tab 422 is made to include a first portion 422a and a second portion 422b, and the second portion 422b is made to surround a periphery of the first portion 422a, and the separator 42c is made to wrap the second portion 422b so as to isolate the second portion 422b from the shell 41. Along the axial direction X of the electrode assembly 42, the first portion 422a extends beyond the second portion 422b and the separator 42c, while the second portion 422b does not extend beyond the separator 42c. As such, the separator 42c can form a protection for the second portion 422b, and reduce the possibility of the second portion 422b coming into contact with the shell 41. In addition, since the second portion 422b does not need to connect with the adapter piece 44, the second portion 422b does not need to undergo a bending process or a flattening process, so that the second portion 422b itself does not accumulate elastic potential energy or accumulates small elastic potential energy; therefore, the second portion 422b is not easily deformed or deforms with a small amount, and thus it is not easy for the second portion 422b to come into lap contact with the shell 41, thereby reducing the possibility of short circuit caused by the lap contact between the second portion 422b and the shell 41. The second portion 422b can also serve as a buffer area, so that it is not easy for the first portion 422a to come into lap contact with the shell 41, thereby effectively reducing the possibility of short circuit caused by the lap contact between the first portion 422a and the shell 41.

In some embodiments, a part of the tab 422 of the electrode assembly 42 is cut away to form the second portion 422b.

Figure 16:
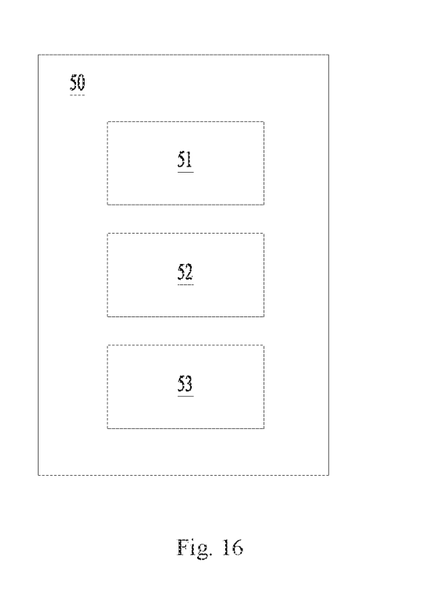
FIG. 16 is a schematic diagram of a manufacturing system for a battery cell according to an embodiment of the present application.

Referring to FIG. 16, based on the battery cell 40 of the above-mentioned embodiments, embodiments of the present application further provide a manufacturing system 50 for the battery cell 40, the system 50 includes:

a first assembling device 51, configured to manufacture an electrode assembly 42 including a separator 42c and a tab 422, the tab 422 including a first portion 422a and a second portion 422b, the second portion 422b surrounding a periphery of the first portion 422a, and the separator 42c wrapping the second portion 422b to isolate the second portion 422b from the shell 41, wherein along an axial direction X, the first portion 422a extends beyond the second portion 422b and the separator 42c, and the second portion 422b does not extend beyond the separator 42c;

a second assembling device 52, configured to provide the shell 41 including an opening; and a third assembling device 53, configured to load the electrode assembly 42 into the shell 41, wherein in the axial direction X of the electrode assembly 42, the tab 422 is located at one end of the electrode assembly 42 and extends toward the opening.

While the present application has been described with reference to the preferred embodiments, various modifications may be made to the present application and components therein can be replaced with equivalents. In particular, as long as there is no structural conflict, various technical features mentioned in various embodiments can be combined in any manner. The present application is not limited to the specific embodiments disclosed herein, but includes all technical solutions falling within the scope of the claims.

What is claimed is:

1. A cylindrical battery cell, comprising:
a shell, comprising an opening;
an electrode assembly, disposed in the shell, the electrode assembly comprising a separator and a tab, along an axial direction of the electrode assembly, the tab being located at one end of the electrode assembly and extending toward the opening, the tab comprising a first portion and a second portion, the second portion surrounding a periphery of the first portion, and the separator wrapping the second portion to isolate the second portion from the shell;
a cap;
a first insulating member; and
a second insulating member,
wherein along the axial direction, the first portion extends beyond the second portion and the separator, and the second portion does not extend beyond the separator,
the cap is configured to cover the opening and connected to the shell, the first insulating member is disposed on a side of the cap close to the electrode assembly, the first insulating member comprises a recess, and at least part of the first portion is accommodated in the recess, the second insulating member surrounds the first insulating member and the second portion, and covers an edge of the first insulating member and an edge of the second portion.

2. The cylindrical battery cell according to claim 1, wherein a dimension of the first portion extending beyond the separator is H, and a difference between an outer diameter and an inner diameter of the second portion is L, wherein L is greater than H.

3. The cylindrical battery cell according to claim 2, wherein the dimension H of the first portion extending beyond the separator ranges from 1 mm to 8 mm.

4. The cylindrical battery cell according to claim 1, wherein the first insulating member is in contact with a part of the separator extending beyond the second portion.

5. The cylindrical battery cell according to claim 1, wherein the first insulating member comprises a body portion and an extension portion connected with each other, the body portion is configured to connect with the cap, the extension portion extends and protrudes from the body portion and toward the electrode assembly to form the recess, the extension portion surrounds the periphery of the first portion, and the extension portion is in contact with a part of the separator extending beyond the second portion.

6. The cylindrical battery cell according to claim 5, wherein the extension portion is formed as a closed annular structure extending continuously, or is formed as an annular structure with a notch.

7. The cylindrical battery cell according to claim 1, wherein the second insulating member presses against an outer side surface of the first insulating member facing the shell.

8. The cylindrical battery cell according to claim 7, wherein the outer side surface comprises a guide inclined surface, the guide inclined surface being inclined toward the recess in a direction away from the cap.

9. The cylindrical battery cell according to claim 1, wherein the electrode assembly further comprises a first electrode plate and a second electrode plate, wherein the first electrode plate and the second electrode plate each comprises a coated area and an uncoated area, the uncoated area of the first electrode plate or the second electrode plate forms the tab, the separator is adapted to isolate the first electrode plate from the second electrode plate, and the first electrode plate, the second electrode plate and the separator are wound to form the electrode assembly.

10. A battery comprising the cylindrical battery cell according to claim 1.

11. An electricity consuming device, comprising the cylindrical battery cell according to claim 1, the cylindrical battery cell being adapted to provide electrical energy.

12. A manufacturing method of a cylindrical battery cell, the method comprising:
   providing a shell comprising an opening;
   providing an electrode assembly, the electrode assembly comprising a separator and a tab, the tab comprising a first portion and a second portion, the second portion surrounding a periphery of the first portion, the separator wrapping the second portion to isolate the second portion from the shell, wherein along an axial direction of the electrode assembly, the first portion extends beyond the second portion and the separator, and the second portion does not extend beyond the separator;
   loading the electrode assembly into the shell, wherein along the axial direction of the electrode assembly, the tab is located at one end of the electrode assembly and extends toward the opening;
   providing a cap and a first insulating member, wherein the cap is configured to cover the opening and connected to the shell, the first insulating member is disposed on a side of the cap close to the electrode assembly, the first insulating member comprises a recess, and at least part of the first portion is accommodated in the recess; and
   providing a second insulating member to surround the first insulating member and the second portion and to cover an edge of the first insulating member and an edge of the second portion.

13. The manufacturing method of the cylindrical battery cell according to claim 12, wherein the manufacturing method further comprises: cutting away a part of the tab of the electrode assembly to form the second portion.

14. A manufacturing system for a cylindrical battery cell, comprising:
   a first assembling device, configured to provide an electrode assembly, the electrode assembly comprising a separator and a tab, the tab comprising a first portion and a second portion, the second portion surrounding a periphery of the first portion, wherein along an axial direction of the electrode assembly, the first portion extends beyond the second portion and the separator, and the second portion does not extend beyond the separator;
   a second assembling device, configured to provide a shell and a cap, wherein the shell comprises an opening, the cap is configured to cover the opening and connected to the shell, the cap comprises a first insulating member is disposed on a side of the cap close to the electrode assembly, the first insulating member comprises a recess, and at least part of the first portion is accommodated in the recess; and
   a third assembling device, configured to:
      load the electrode assembly into the shell, wherein along the axial direction of the electrode assembly, the tab is located at one end of the electrode assembly and extends toward the opening, and the separator wraps the second portion to isolate the second portion from the shell,
      provide a second insulating member to surround the first insulating member and the second portion and to cover an edge of the first insulating member and an edge of the second portion, and
      cover the opening with the cap.

* * * * *